UNITED STATES PATENT OFFICE.

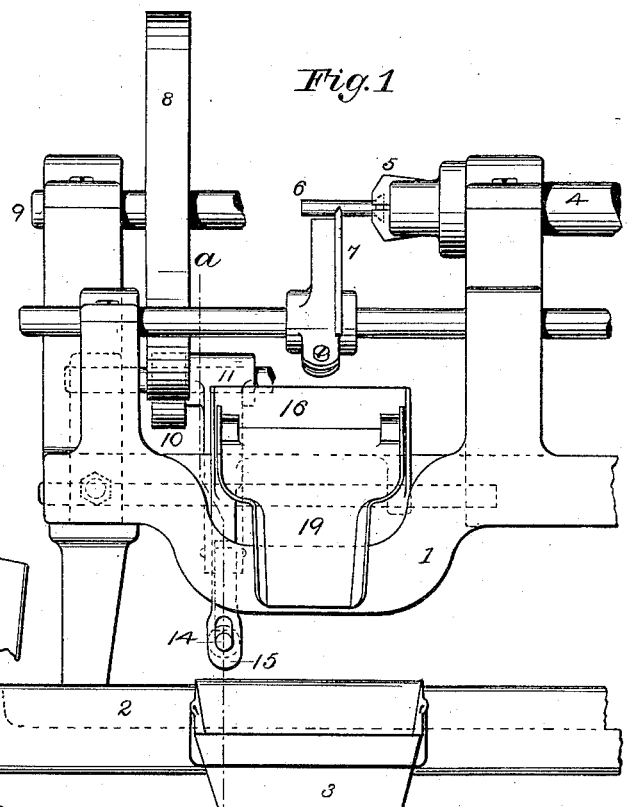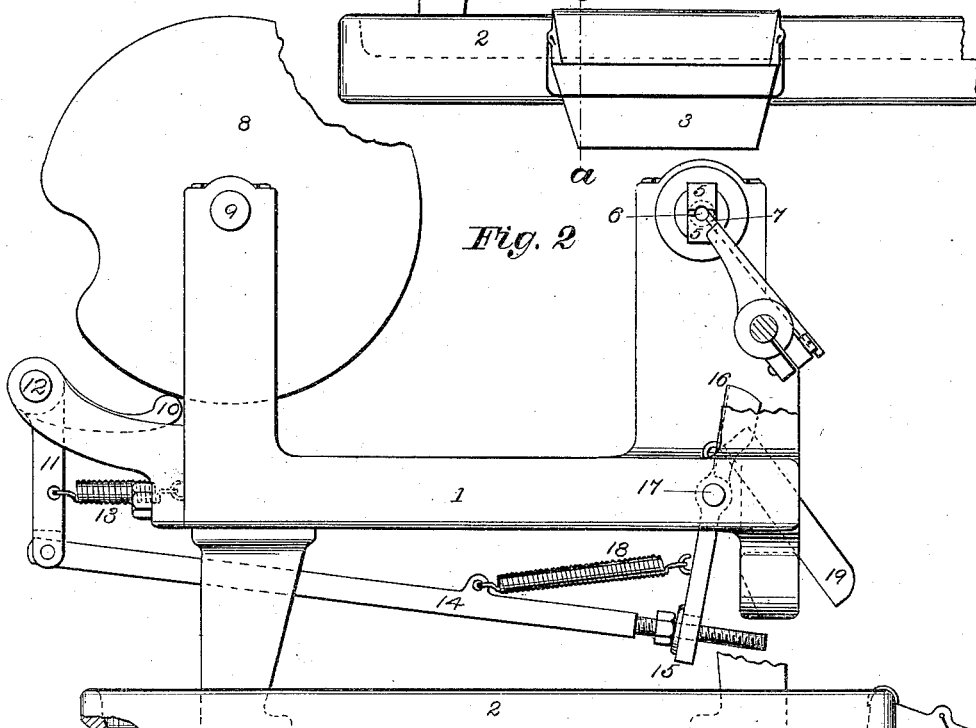

JOHN ALGER AND JOHN F. COOK, OF HARTFORD, CONNECTICUT, ASSIGNORS TO ASA S. COOK, OF SAME PLACE.

SCREW-MACHINE.

SPECIFICATION forming part of Letters Patent No. 319,542, dated June 9, 1885.

Application filed March 14, 1885. (No model.)

*To all whom it may concern:*

Be it known that we, JOHN ALGER and JOHN F. COOK, of Hartford, Connecticut, have invented a new and useful Improvement in Screw-Machines, of which the following description and claims constitute the specification, and which is illustrated by the accompanying sheet of drawings.

This invention relates to a chute for directing the fall of the completed screws in a different direction from that of the chips which are made in threading the screws.

Figure 1 of the drawings is a front view of the invention and of its immediate environment. Fig. 2 is a side view of what is shown in Fig. 1, looking from the left of that figure. Fig. 3 is a view of the right-hand part of what is shown in Fig. 2, but with the chute in another position.

The frame of the machine is indicated by the numeral 1, while the numeral 2 indicates the pan in which the frame sits, and into which the chips fall, and 3 indicates a bucket, into which the screws are directed by the chute. The spindle 4 is provided with the chuck 5, and rotates the screw-blank 6, under the action of the cutter 7. The cam 8 is keyed to the shaft 9, and continuously rotates once for each screw manufactured. The arms 10 and 11 are integral at their junction, and are forced to oscillate with the shaft 12 by the action of the cam 8 and the spring 13. The rod 14 is pivoted to the arm 11 at one end, and its other end passes through a hole in the arm 15, which projects downward from the chute 16, and which is pivoted to the frame 1 at 17, and is connected to the rod 14 by the spring 18. The auxiliary chute 19 is hung to the chute 16 in such a way as to constitute a continuation thereof.

The mode of operation is as follows: While each screw is being threaded, the extremity of the arm 10 is in contact with the convex part of the periphery of the cam 8, and the chutes are in the position shown in Fig. 2, thus allowing the chips to drop into the pan past the left-hand side of the chutes. When each screw is finished, and is about to be released from the chuck, the extremity of the arm 10 enters the concave part of the periphery of the cam 8, and causes the chutes to take the position shown in Fig. 3. Then the completed screw drops into the chutes, and thence into the bucket.

I find it convenient to use the two chutes 16 and 19; but an obvious modification of the form of the chute 16 enables it to perform the functions of both. So, also, the spring 18 may be omitted, and the rod 14 be pivoted to the arm 15, though I prefer the arrangement shown in the drawings. Moreover, the spring 13 may be dispensed with, and the arm 10 be worked by a groove in the border of the cam 8, corresponding in curvatures with the present periphery of that cam. Indeed, the chutes may be worked by a rod one end of which is attached to the arm 15, and the other end of which is provided with a pin or roller worked by such a cam-groove.

We claim as our invention—

1. The combination of the cam 8 with the chute 16 by means of intermediate mechanism, substantially as described.

2. The combination, by means of intermediate mechanism, substantially as described, of the cam 8 with the chutes 16 and 19, all substantially as set forth.

JOHN ALGER.
JOHN F. COOK.

Witnesses:
ALBERT H. WALKER,
WILLARD EDDY.